Figure 1:
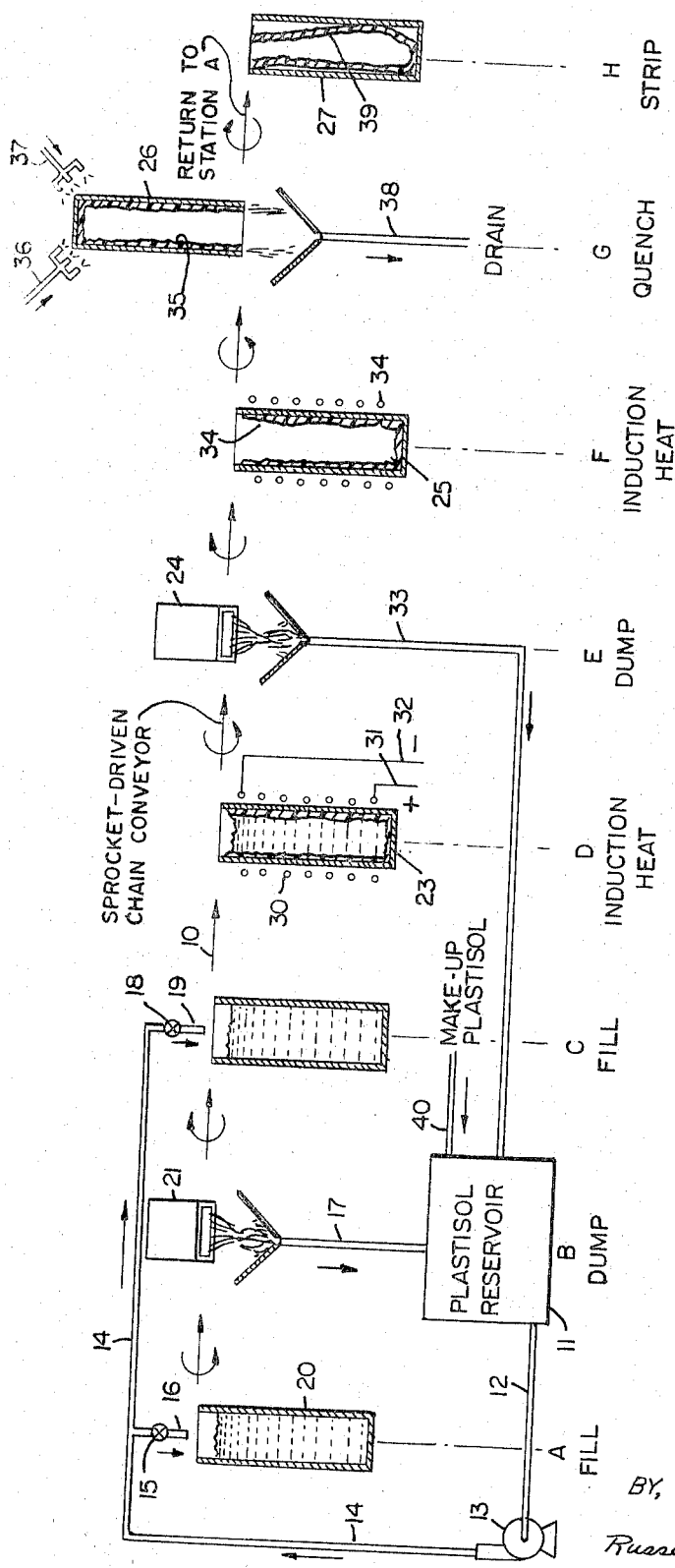
Figure 2:
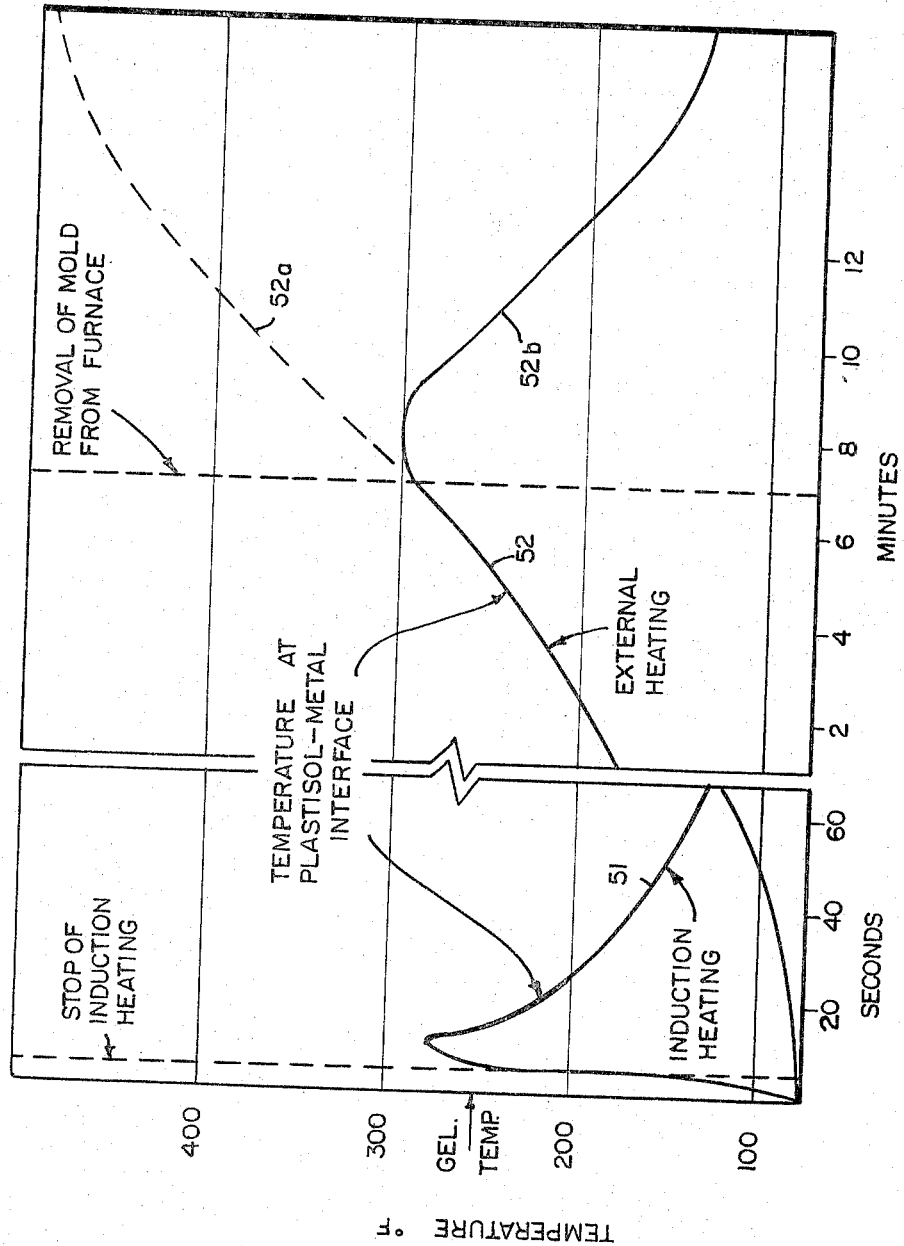
Figure 3:
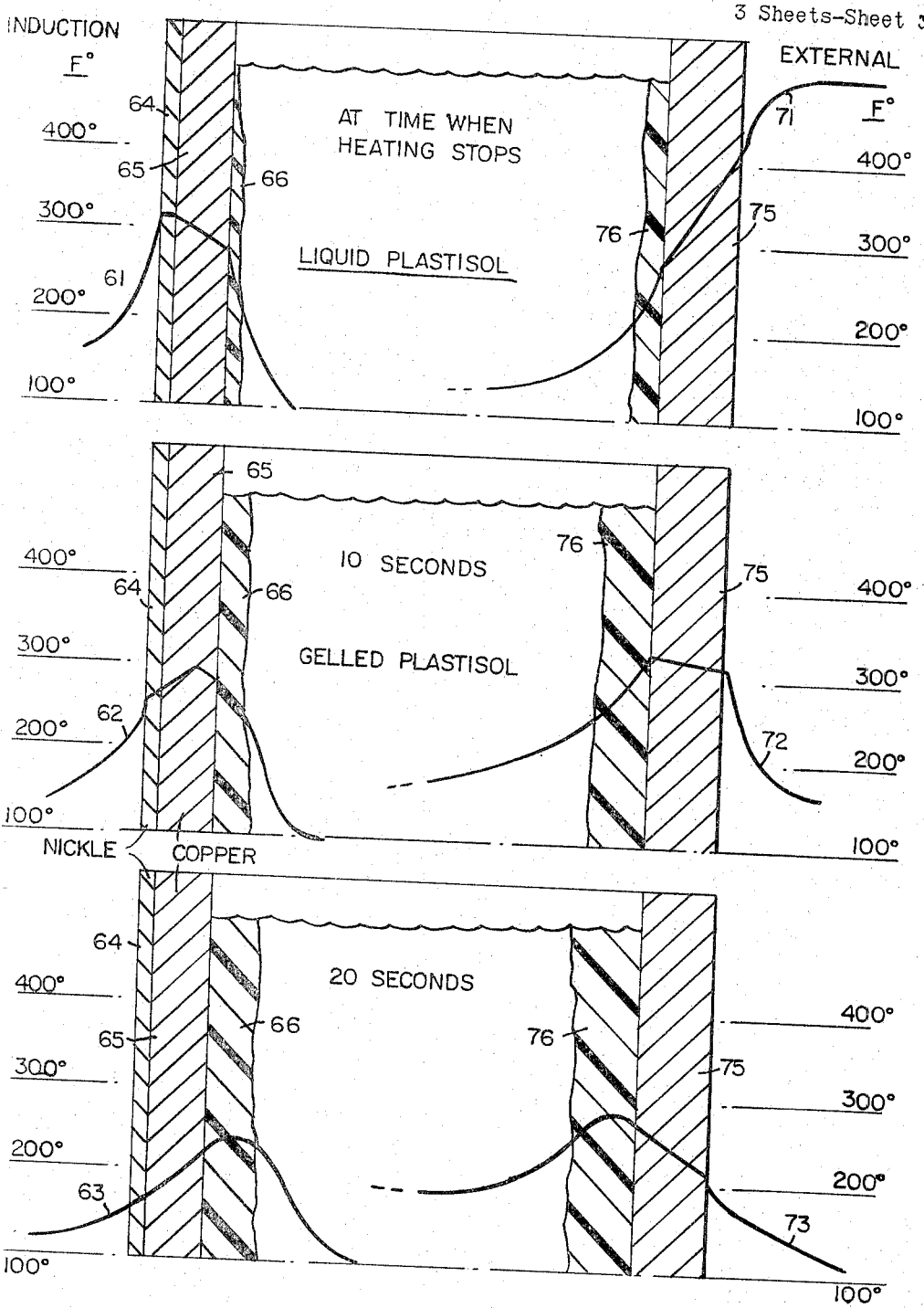

3,315,016
INDUCTION HEATED-SLUSH MOLDING PROCESS
John M. Wersosky, Dover, and Donald A. Moore, New Castle, N.H., assignors to Davidson Rubber Company, Incorporated, a corporation of Delaware
Filed June 25, 1964, Ser. No. 377,887
7 Claims. (Cl. 264—25)

This invention pertains to a process and apparatus for the manufacture of hollow, thin-walled articles from a vinyl plastisol by slush molding, and more particularly pertains to the manufacture of such articles using induction heating to gel and fuse the plastisol.

Slush molding procedures are well known as are the vinyl plastisol compositions used in slush molding. In the slush molding of hollow, thin-walled articles, a hollow metal mold having an open upper end is filled with liquid plastisol. The mold is then externally heated, usually in a hot air or radiant heat furnace but a salt or other type of bath may be used. This heating of the mold first heats the liquid plastisol layer adjacent the mold wall and when the temperature of this layer becomes high enough the layer gels. The thickness of the gelled layer depends upon the temperature to which the inner plastisol layer is raised and the time the plastisol is maintained at this temperature. In order to obtain a gelled layer of proper thickness in a furnace it is usually necessary to heat a mold for 6 to 7 minutes and in a salt or similar bath for 0.5 to 1.5 minutes. The use of a salt bath is objectionable because of the dirt and fumes.

After the layer adjacent the mold wall is gelled, the main ungelled body of the plastisol in the mold is dumped or poured out and the mold is then subjected to a second heating step to a higher temperature to completely fuse the gelled plastisol layer.

Conventional slush molding processes are characterized by a relatively slow rate of heat input and are troubled during the heating steps by the tendency to overshoot and overheat the plastisol. The changes that occur in a plastisol are time-temperature dependent. The plasticizer of the plastisol must partially solvate or penetrate and swell the plastic particles to gel the plastisol and must totally solvate the plastic particles when the plastisol is fused. The tendency of the plasticizer to solvate the suspended plastic particles increases with temperature and the longer the plastisol is maintained at some elevated temperature, the more solvation occurs.

In a conventional slush molding process where the mold is heated in a furnace during the gelling step the heat transfer medium, e.g., hot air, must have a temperature considerably greater than that required to be reached by the mold walls in order to obtain the desired temperature in the mold walls within a practical time period. The transfer of heat into the mold wall is resisted by the stagnate gas film that exists at the mold wall-gas interface and the temperature of the heating medium "leads" the temperature of first the mold wall and secondly of the plastisol layer, both of which considerably "lag" behind because of resistance of the various films or layers to the transfer of the heat. If the temperature of the heating medium is made too great in order to shorten the gelling time, then the gelling step becomes extremely sensitive and control is lost with the attendant danger of over or undershooting. If an insufficient thickness is gelled, the product is, of course, unsatisfactory. If the heating results in an overshooting and the gelled layer is thicker than necessary, there is needless consumption of plastisol and the articles become relatively more expensive. If the overshooting is too great there is also the danger of thermally damaging or scorching the plastisol. This problem of heat transfer makes overshooting difficult to avoid in many cases, particularly with articles of complex shape. The lead-lag problem also makes it difficult to select the optimum time for removal of molds from the furnace.

There is the need in the industry for an automated slush molding process, particularly for large volume items of complicated shape such as automobile sun visor and crash pad covers. Some attempts have been made using salt baths but they have been by and large unsuccessful because the main body of the plastisol dumped from the mold each time and recycled builds up in viscosity, even with dilution, and fouls the equipment. Because of the slow rate of heat input, there is no sharp distinction between the gelled and ungelled layers so that some "partially" gelled plastisol is drained from the mold. This problem of viscosity build-up is accentuated when molds having high volume to surface area ratios are used. Also, the overall temperature of the recycled plastisol tends to increase to an undesirable extent.

In the slush molding of hollow thin-walled articles only in the range of 3 to 15%, usually 5 to 10%, of the material in the mold is gelled per pass and the remainder is recycled. This results in very high recycle rates. The bulk of the plastisol that is recycled, if heated to some elevated temperature in excess of 130°–140° F. as a result of the method used to heat the mold during the gelling step, has the opportunity to and usually does undergo viscosity changes in addition to the increase in viscosity imparted by the "partially" gelled layer. This viscosity increase prevents process based on conventional heating techniques from being continuously operable when operating with recycle.

In the present invention, it has been surprisingly found that induction heating when used to heat the mold during this gelling step overcomes these problems. One would think that the rapidity of heating permitted by induction heating would lead to insensitivity and lack of control with overshooting, scorching and/or viscosity build-up of the recycled plastisol being the consequence. It has been found, however, that this is not the case, possibly because the rapidity of heating and dumping avoids penetration of the heat into the bulk of the plastisol and permits a sharp interface between the gelled and ungelled layers. Observations on an automated commercial line with 40 molds producing plastisol sun visor covers at a rate of 240 per hour per single induction heated gelling coil established that viscosity build-up was negligible and that the temperature of the main body of the recycled plastisol need not exceed 130° and usually 120° F., even without cooling. In addition, it has been found that the much finer interface between the gelled and ungelled layer results in a much smoother and more uniform shell. This permits a thinner gelled layer to be formed safely without holidays or thin spots with a consequent material reduction in plastisol consumption and in the cost of the article. This invention has been found to be particularly applicable to the manufacture of large sized articles of complicated shape, e.g. articles having an interior mold area surface greater than 2 square feet, having vertical sections of one foot or more, and/or having varying cross sectional shapes and sizes along the axis of the mold such as occurs in an automobile sun visor cover. It is especially suited to molds having surface area to volume ratios in excess of 3 ft.$^2$/ft.$^3$. Heat sinks or "chills" can be used with the molds to control the thickness of the vinyl shell as required.

The skilled in the art will appreciate that since the heating during the gelling can be carried out so quickly, in less than 10 seconds, cycle time is greatly reduced and the number of pieces produced by a mold per hour is substantially increased. The amount of tooling required for any run is thus reduced which is a material advantage.

In a particularly preferred embodiment of this invention, a metal mold of special design is used. The mold has an inner electro-deposited wall of a good heat conductor, preferably copper. This material has a relatively low permeability and is not too responsive to an electromagnetic induction heating field. In this preferred embodiment there is deposited on the external side of the copper shell mold a layer of a metal having a relatively high permeability and poor electrical conductivity such as nickel. This nickel layer preferentially absorbs the electromagnetic waves of the induction heating field and can be within a period of 6 to 10 seconds heated to a very elevated temperature, whereas if copper alone were used it would take 3 to 5 times as long to reach the equivalent temperature and close coupling with the coils would have to be practiced.

In induction heating, the metal object within the induction heating coil tends to be heated non-uniformly in relation to the spacing between each turn of the coils because the field is stronger in the plane of each coil. In the present process, the nickel responds similarly but because the inner part of the mold wall is made up of a relatively heavier layer of a better heat conductor, i.e., the copper, this tends to mask or override the coil pattern picked up by the nickel layer. The copper effects a much more uniform distribution of the heat. Thus, this mold design allows more tolerance in the positioning of the coils relative to the mold and also allows greater coil spacings and looser couplings to be used as well as higher flux densities for more rapid heating. It is also possible in the present process to vary the nickel composition in order to control heat density and, consequently, shell thickness. The nickel density and, consequently, shell thickness. The nickel in one area can be made to be more permeable and in another area to be less permeable such that in a critical area more or less heat can be supplied as desired without changing coils. This is an important consideration when one considers an automated line may have as many as 40–60 molds which molds in production quantities would be difficult to make exactly alike. If one mold is found not to be suited to the particular coil pattern the mold can be "touched up" as needed to accommodate its differences and make it equivalent to its neighbors. Also, one may wish to run more than one mold form on an automated line and yet use only one induction heating coil. Molds of different sizes and/or shapes can be adapted to fit the field generated by a single induction coil by varying the composition of the external nickel plating and/or the thickness of the electro-deposited copper layer of the mold. The intensity and/or duration of the electromagnetic field can, of course, also be changed on an automated line to fit that required by each consecutive mold when the line has several types of molds of different weights and/or configurations.

Overall mold wall thickness can vary from 25 to 250 mils, usually from 30 to 90 mils. The copper layer will usually be 30 to 60 mils thick. The weight ratio of nickel to copper in the preferred embodiment will usually be in the range of 1 to 3. A minimum amount of nickel is used, in order of 2 to 30 mils, and preferably 10 to 20 mils. Greater thicknesses are not required because the high frequency field affects only the outer "skin" of the mold. The nickel can be alloyed with other metals such as cobalt. Other metals that are good heat conductors such as aluminum can be substituted for the inner copper layer, and iron or steel can be used in place of the outer nickel layer. An aluminum inner shell may be preferred when the mold is to be prepared by casting rather than electroforming.

The nature of this invention will become clear from the following description and examples made with reference to the drawings attached to and forming a part of this specification.

In the drawings:

FIG. I schematically illustrates an automated slush molding process based on the principles of this invention;

FIG. II is a graphical portrayal of the changes in temperature occurring with time in the present slush molding process using induction heating during gelling versus those occurring when the mold is externally heated during gelling as in a furnace; and FIG. III is a graphical portrayal of the temperature profiles at different times during the gelling step in the present process as compared to a process where external heating is used.

Referring to FIG. I, the invention will be described with respect to an automated line containing one induction heating gelling station, one induction heated fusing station and 40 shell molds evenly divided into four types to produce 1964 Ford sun visor covers identified by the following part numbers: C3AB–6504100AW; C3DB–6204100AW; C3OB–6204100AW and C3AB–6304100EW.

Vinyl shells were produced on this line at a rate of 240 per hour with a reject rate of 0.5 to 1.0%. The plastisol consumption averaged 180 grams per shell and the skin thickness of the shells was 25 mils plus or minus 5 mils.

To avoid redundancy only the mold for Part No. C3AB–6504100AW ("504" hereafter) will be described in detail. This part had a length of about 26 inches, a width at the broadest part of 5.5 inches, a maximum thickness of 1 inch, a volume (based on external dimensions) of 145 cubic inches and a surface area of 280 square inches. The plating form was made in a known manner by casting wax into a master followed by the application of chemically reduced silver to make the surface conductive. Copper to a thickness of 45 mils was then electro-deposited in a conventional manner. The weight of copper deposited was about 1820 grams. The copper was substantially pure. A layer of nickel approximately 15 mils thick was then electro-deposited in a conventional manner using a nickel sulfonate plating solution. The total weight of nickel deposited was 568 grams. The wax was then removed by melting. The inside of the mold was then covered with a very thin layer of electroless nickel to improve release of the vinyl shells from the mold. The three other types of shell molds are made substantially in the same manner.

The plastisol used had the following composition:

| | Parts by wt. |
|---|---|
| PVC–A | 60 |
| PVC–B | 40 |
| Didecylphthalate (contains 25% bisphenyl) | 38 |
| Didecyladipate | 18 |
| Epoxidized soybean oil | 4 |
| Inhibitor | 3 |
| Filler (crystalline $CaCO_3$) | 25 |
| Stearic acid | 0.75 |
| | 188.75 |

PVC–A was Opalon 44 (Monsanto Chemical Co.), PVC–B was Borden 260-C (Borden Chemical Co.) and the inhibitor was Nuedex 1060 (Nuedex Chemical Co.).

The plastisol was blended by conventional techniques in a vacuum mixer. Its viscosity was approximately 1000 centipoises at 85° F. After mixing, the plastisol was tinted and one ounce of a silicone foam depressant was added (DC-200, Dow Corning).

With reference to FIG. I, the automated line consisted of an overhead sprocket-driven chain conveyor indicated generally at 10 carrying the four types of shell molds designated by the numbers 20 through 27 and equipped with suitable conventional trips, cams and levers to rotate the shell molds at the various stations to different attitudes as indicated by the circular arrows about conveyor 10. The exact sequence of the types of molds on the line is immaterial.

The automated line had eight stations, designated A through H. The process will be described as the shell molds might exist at each station at some instance of time. At the first station, station A, mold 20 is in a vertical position with the opening at the top. It is filled with a metered amount of the plastisol from reservoir 11 by line 12, pump 13, line 14, control valve 15 and line 16. For the "504" shell mold the amount of plastisol used is about 1800 grams. At station B, mold 21, previously filled at station A, has been rotated to a vertical position and the plastisol is being dumped with the plastisol being returned by line 17 to reservoir 11. At station C, mold 22 is being refilled with a metered amount of plastisol supplied by line 14, control valve 18 and line 19. While in some cases only one filling step need be used, draining and refilling are preferred to avoid air entrapment because most shell molds have some undercuts.

At station D, shell mold 23 filled with liquid plastisol is being heated by means of an electro-magnetic energy field supplied by induction heating coil 30. This coil consists of about 26 turns and is spaced from the shell mold a minimum of 0.5 inch. The overall height of the coil is about 29 inches. The coil spacing is such that for this type of elongated shell mold a higher concentration of energy is delivered to the bottom of the mold as compared to the average for the rest of the mold. The reason for this is that as the mold is inverted for draining a thicker gel coat is required at the mold bottom to prevent excessive draining towards the inverted top since there is no material to replace that which is drained from the inverted bottom such as is the case with the remainder of the gelled layer on the mold wall.

Current at a frequency of about 200 kc., a voltage of about 800 volts and a current of 250-400 R.F. amps is supplied to coil 30 by lines 31 and 32 for a period of about 5 seconds in the case of the shell mold for the "504" part. A high frequency induction generator rated at 50,000 watts has been found to be satisfactory.

In operation, the induction heating coil is made to be raised and lowered vertically. As the shell mold filled with plastisol moves into the station the induction heating coil is in a lowered position. Thereafter when the shell mold is in the proper position the induction heating coil is raised, as by pneumatic means. It is preferred to have the coil stop at a fixed position each time, and to vary the bottom position of the various types of molds on the conveyor in order to position the molds properly in the coil. After the coil reaches its stop position the power is applied to the coil for the preselected time and at the preselected intensity.

At station E, shell mold 24 after leaving station D is rotated to a vertical position so that the ungelled plastisol can be dumped from it. The dumped plastisol is collected by line 33 and returned to reservoir 11. For the size of the mold used in this example the average recycle rate is about 90%, which is quite high.

At station F, shell mold 25 with the thin layer of gelled plastisol 34 therein is being heated by induction heating coil 34 which operates in the same manner as coil 33, that is, it can be raised and lowered and is connected to a similar source of power. The coil need not be constructed, however, to supply a higher concentration of energy at the bottom of the mold since this is no longer needed. The coil is constructed to uniformly heat the entire surface of the mold, consistent with the mold configuration and shell thickness. For the shell mold for the "504" part the heating time is about 9 seconds and the plastisol layer is raised to a temperature of about 360° F.

While the vinyl shell could be cured at this point in a conventional oven, induction heating is preferred. There is a temporary decrease in viscosity in the innermost portion of the semi-gelled plastisol during the heating, and if the heating is too slow, there may be some drain back which may cause variations in thickness. The rapidity of the high frequency induction heating eliminates this.

The molds after the fusing of the plastisol layer are transferred from station F to station G, being rotated in process to an inverted position. At station G, inverted shell mold 26 is being sprayed with water to quench it and bring its temperature down so that the fused plastisol layer 35 therein can develop strength in preparation for stripping. Water is supplied by lines 36 and 37 and water drained from the mold is removed by drain line 38. The mold is inverted to prevent entrance of water into the interior thereof.

The shell molds at station G are thereafter transferred to station H being rotated back to the beginning attitude. At station H mold 27 is stripped of the vinyl shell 39 therein by conventional means such as by an operator grabbing the end of the vinyl shell and removing it from the shell mold with the assist of an air blast between the vinyl shell and the shell mold.

The shell molds from station H are then returned to station A to repeat the process. Make-up plastisol is supplied to reservoir 11 by line 40 as needed.

The induction heating coil can be designed to accept power at the rate of 10 kw. to 50 kw. and can contain from 15 to 30 coils. Heating times will usually be in the range of 0.5 to 10 seconds and the temperature of the shell mold wall in the gelling step may be raised to above 150° F. and preferably to about 200 to 270° F. and in the fusing step to about 340 to 400° F.

Reference to FIGS. II and III will serve to make the advantages of the present process clear. These figures are illustrative and do not necessarily portray accurately any given situation. FIG. II compares the changes in temperature which are occurring in the present induction heated slush molding process to those that are obtained with an external heating method, say a hot air furnace. Line 51 shows the rate of change of temperature with time that might be expected at the plastisol-metal interface of the shell mold in the present process and line 52 similarly illustrates that which might be expected with a conventional process. It can be seen that with induction heating the heating is extremely rapid and the temperature of the shell mold wall jumps up quite rapidly to the peak temperature and thereafter falls off quite rapidly. Power to the induction heating coil can, of course, be turned on and off almost instantaneously, within milliseconds, which permits very accurate control of the heating cycle.

With conventional heating the rate of the heat input is much slower because of the resistance to the transfer of heat by the stagnant gas film on the outside of the mold wall. Heat must flow in from the heating medium to the shell mold and is not generated within the shell mold wall as in the case of induction heating. As a consequence, the rate of temperature increase in the shell mold wall is much slower which makes it difficult to judge the cut-off time. Thus, it is the custom when heating with a furnace to go somewhat beyond the most optimum point to assure that all the molds in a furnace and all the parts of any one mold have been heated to a temperature high enough to insure that at least a minimum thickness in the gelled layer has been obtained. The heating gas has a temperature considerably higher than that desired to be reached by the shell mold wall in order to shorten as much as possible the heating cycle. This means that if a slight error is made in moving the shell mold into and from the furnace overshooting occurs as indicated by line 52a, the dashed line continuation of line 52. Thus, the peak temperature to which the mold wall is heated is higher than that obtained with induction heating. As explained in connection with FIG. III, because the body of the plastisol is heated to a higher temperature the chilling effect by the plastisol within the mold is less. The rate of cooling, indicated by line 52b is slower which permits more heat soaking of the plastisol.

FIG. III illustrates the temperature profile through a cross-section of the shell mold wall and plastisol layer at various times during heating and cooling. The series of three cross-sectional views at the left of the drawing indicate by temperature profile lines 61, 62 and 63 the temperatures that might be expected in the various layers in the present induction heating process. As illustrated, 64 indicates the electro-magnetic nickel layer, 65 illustrates the copper layer and 66 indicates the gelled plastisol layer.

With reference to the right side of FIG. III temperature profile lines 71, 72 and 73 illustrate the temperature profile obtained with external hot air heating. Illustrated in section is the mold wall 75 and a gelled plastisol layer 76.

Looking at the upper portion of the FIG. III, at the time when heating stops, in the case of induction heating, the nickel layer has been heated to its highest temperature and heat flows to the right with the temperature decreasing as illustrated until it reaches the plastisol mold wall interface where there is a good deal of resistance to the transfer of the heat to the plastisol which accounts for the sharp break in the line. Nevertheless, the temperature of the mold wall at the interface is relatively high so that the driving force for transferring the heat is relatively high. In the case of external heating as indicated by line 71, the external surrounding gas temperature must be quite high. As at the mold wall-gas interface resistance to heat transfer is met and the temperature on the external side of the shell mold lags considerably behind the heating gas temperature. The flow of heat then meets the resistance offered by the mold wall and the temperature profile declines until it reaches the plastisol-mold wall interface. At this interface, there is a drop in the temperature over a short distance, and then the temperature gradient more gradually declines into the bulk of the plastisol. The interior of the bulk of the plastisol shown as a higher temperature than in the case of induction heating because the shell mold has been exposed to elevated temperature for a time period at least 100 times longer such that there has been a longer time for heat to pass into the bulk of the plastisol.

Referring to the middle section of FIG. III temperature profile lines 62 and 72 are shown at some time after the heating cycle, e.g. 10 seconds. As indicated by line 62, it can be seen that the temperature decrease in the metal wall in the case of induction heating has been much greater due largely to the fact that there is a chilling effect of the ungelled layer of the plastisol whereas this effect is not as great in the case of external heating, as shown by line 72. Because the rate of cooling of the mold in the case of external heating is slower there is more soaking of the contents of the mold such that the temperature of the bulk of the ungelled plastisol rises to a higher degree than with induction heating.

The bottom of FIG. III shows the relative positions of the two temperature profiles, 63 and 73, at some later time, say 20 seconds after removal from the heat source. There is a further rise in the temperature of the bulk of the ungelled plastisol, but it is much less in the case of induction heating.

It can be appreciated that the more gradual slope of the profile through the gelled and ungelled plastisol layers in the case of external heating results in more "partially gelled" material which is detrimental as previously explained. While not illustrated, the gelled layer is usually much less uniform with external heating and the plastisol consumption per piece is higher.

"Plastisol" is used in the sense given on page 22 and on page 799 of the Modern Plastics Encyclopedia, 1963, Issue, September 1962. Plastisols are usually based on polyvinylchloride resins. The platisols used in this invention can, if desired, contain blowing or foaming agents to create an expanded structure or sponge, either open or closed cell. "Slush molding" is further described starting on page 801 of the Modern Plastics Encyclopedia.

Having described this invention, what is sought to be protected by Letters Patent is succinctly set forth in the following claims.

What is claimed is:

1. In a process of slush molding hollow thin-walled flexible plastic articles from a plastisol wherein: a hollow metal mold is filled with said plastisol, the wall of said metal mold in heated to heat gel a thin layer of said plastisol thereon, ungelled plastisol is dumped from said metal mold, the metal mold is then heated to fuse said thin layer and the completed plastic article is thereafter stripped from said metal mold; the improvement comprising heating said metal mold by induction heating to heat gel said plastisol while maintaining during and after said induction heating the temperature of the main ungelled body of said plastisol in said mold at a temperature that does not cause appreciable viscosity buildup when said plastisol is recycled, said mold consisting of at least two layers of metals of dissimilar compositions, the outer layer having good magnetic permeability and the inner layer adjacent thereto having relatively good heat conductivity, said mold being of elongated and of varying cross sections along the long axis thereof, and the spacing of the coils used for said induction heating being such that the lower ¼ portion of said mold reaches an average temperature after said induction heating that is at least 20° F. higher than average temperature reached by the upper ¾ portion thereof.

2. A process of manufacturing a hollow, thin-walled plastisol article comprising the steps in continuous sequence of:
   (1) filling at a first station an open-ended metal mold with a liquid plastisol;
   (2) heating said mold at a second station by an induction heating coil and forming a gel coat therein;
   (3) dumping at a third station ungelled plastisol from said mold;
   (4) heating said mold at a fourth station and fusing the gel coat thereon;
   (5) cooling said mold at a fifth station, and
   (6) stripping at a sixth station the thus formed article from said mold;
       said mold being carried through the sequence of said stations by a continuous conveyor with said mold being directly returned to said first station from said sixth station; and said plastisol which is dumped at said third station being returned to a central reservoir from which the plastisol for use in the first station is withdrawn, and said mold having a wall composed of two layers of metals of dissimilar composition, the outer layer having good magnetic permeability and the inner layer having relatively good heat conductivity.

3. The process of claim 2 wherein between steps (1) and (2) thereof said plastisol is dumped from said mold and said mold is then refilled with said plastisol.

4. The process of claim 2 wherein the heating of step (2) is accomplished in less than 10 seconds and the main ungelled body of said plastisol at said second station and thereafter is maintained at a temperature of less than 130° F.

5. The process of claim 2 wherein the fusing of said gel coat in step (4) is accomplished with induction heating.

6. The process of claim 2 wherein said mold has an interior surface area greater than 2 square feet and a surface area to volume in excess of 3 square feet/cubic foot.

7. The process of claim 2 wherein said outer layer is nickel and said inner layer is copper.

References Cited by the Examiner

UNITED STATES PATENTS

| | | | |
|---|---|---|---|
| 2,898,632 | 8/1959 | Irwin | 264 |
| 2,964,798 | 12/1960 | Ferrell | 264 |
| 3,040,384 | 6/1962 | Whittington | 264 |

FOREIGN PATENTS 135,724  12/1946  Australia.

OTHER REFERENCES

Plastics Engineering Handbook, page 284, 1960.

ROBERT F. WHITE, *Primary Examiner.*

R. B. MOFFITT, *Assistant Examiner.*